(12) United States Patent
Alkalay

(10) Patent No.: US 10,813,302 B2
(45) Date of Patent: *Oct. 27, 2020

(54) CYLINDRICAL DRIP IRRIGATION EMITTER

(71) Applicant: METZERPLAS AGRICULTURAL COOPERATIVE LTD., Kibbutz Metzer (IL)

(72) Inventor: Uri Alkalay, Even Yehuda (IL)

(73) Assignee: METZERPLAS AGRICULTURAL COOPERATIVE LTD, Kibbutz Metzer (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,375

(22) Filed: Feb. 7, 2018

(65) Prior Publication Data

US 2018/0228097 A1    Aug. 16, 2018

Related U.S. Application Data

(63) Continuation of application No. 14/117,862, filed as application No. PCT/US2012/037326 on May 10, 2012, now Pat. No. 9,918,438.

(30) Foreign Application Priority Data

May 16, 2011    (GB) .................................. 1108066.0

(51) Int. Cl.
  *A01G 25/02*    (2006.01)

(52) U.S. Cl.
  CPC .......... *A01G 25/023* (2013.01); *Y02A 40/237* (2018.01)

(58) Field of Classification Search
  CPC .............................. A01G 25/02; A01G 25/023
  (Continued)

(56) References Cited

U.S. PATENT DOCUMENTS

| 6,817,548 B2 * | 11/2004 | Krauth ................ A01G 25/023 239/533.1 |
| 2002/0166907 A1 * | 11/2002 | Boswell ............... A01G 25/023 239/542 |

* cited by examiner

*Primary Examiner* — Chee-Chong Lee
(74) *Attorney, Agent, or Firm* — Marc Van Dyke; Momentum IP Group

(57) ABSTRACT

A system including: (a) a pipe having an aperture providing fluid communication between inner and outer pipe surfaces; (b) a cylindrical drip emitter disposed within the pipe, including: an emitter body having an outer facing having a generally convex contour adapted in generally complementary fashion to a concave contour of the inner pipe surface, the outer facing secured to the inner surface; a liquid inlet section adapted to receive a liquid from within the pipe, and to deliver the liquid, via the aperture, to the outer facing; a pressure-reducing section disposed in fluid communication with the liquid inlet section; functionally active sections including the pressure-reducing section, the liquid inlet section, the functionally active sections disposed within, and longitudinally defining, a position of a longitudinal segment of the body; and at least one functionally passive section, disposed on the outer facing, within the longitudinal segment; and (c) a liquid flow path fluidly connecting between the liquid inlet section and the passive section, via the pressure-reducing section, and between the passive section and an ambient environment, via the first aperture, wherein the first aperture is situated within longitudinal bounds of the longitudinal segment, and radially aligned with the functionally passive section disposed within the longitudinal segment.

19 Claims, 8 Drawing Sheets

(58) Field of Classification Search
USPC ....... 239/104, 106, 107, 553.1, 553.13, 566, 239/567, 542, 547; 138/40–46; 285/13, 285/14
See application file for complete search history.

CYLINDRICAL DRIP IRRIGATION EMITTER

FIELD AND BACKGROUND OF THE INVENTION

The present invention relates to drip irrigation emitters, and, more particularly, to compact cylindrical-type drip irrigation emitters.

Drip irrigation is a particularly efficient method of irrigating, particularly in arid environments. Water is slowly applied directly to the soil, enabling the water to be quickly absorbed, whereby losses due to evaporation or to run off are reduced. Drip irrigation systems may be utilized to irrigate a particular area around a plant. This further reduces water consumption and also reduces weed growth.

Market forces are continually demanding improved performance and improved cost efficiencies for drip irrigation systems. While a plethora of drip emitter types and species have been developed to meet various needs of the consumer, the present inventor has recognized a need for further improving the cost efficiency of cylindrical drip irrigation emitters.

SUMMARY OF THE INVENTION

According to the teachings of the present invention there is provided a liquid delivery system including: (a) a pipe having an inner surface and an outer surface, and at least a first aperture providing fluid communication between the surfaces; (b) a drip emitter disposed within the pipe, the emitter including: (i) an emitter body having an inner facing and an outer facing, the outer facing having a generally convex contour adapted in generally complementary fashion to a concave contour of the inner surface, the outer facing secured to the inner surface, the body having a length L; (ii) a liquid inlet section adapted to receive a liquid from within the pipe, and to deliver the liquid to the outer facing; (iii) at least one pressure-reducing section disposed in fluid communication with the liquid inlet section; (iii) functionally active sections including at least the pressure-reducing section and the liquid inlet section, the functionally active sections having a total length La, the functionally active sections disposed within, and longitudinally defining, a position of at least one longitudinal segment of the emitter body; and (iv) at least one functionally passive section, disposed on the outer facing, at least partially within the longitudinal segment; and (c) a liquid flow path fluidly connecting between the liquid inlet section and the passive section, via the pressure-reducing section, and between the passive section and an ambient environment, via the first aperture, wherein the first aperture is situated within longitudinal bounds of the longitudinal segment, and radially aligned with a portion of the functionally passive section disposed within the longitudinal segment; the outer facing spanning, in at least one location, an arc corresponding to an angle of at least 140° of the inner surface of the pipe.

According to further features in the described preferred embodiments, the functionally active sections include a pressure-controlling section.

According to further features in the described preferred embodiments, the functionally active sections consist of the pressure-reducing section, the liquid inlet section, and a pressure-controlling section.

According to further features in the described preferred embodiments, the functionally active sections consist of the pressure-reducing section and the liquid inlet section.

According to still further features in the described preferred embodiments, a length ratio of La to L of the emitter body is at least 0.60 or at least 0.65.

According to still further features in the described preferred embodiments, this length ratio is at least 0.70, at least 0.75, at least 0.78, at least 0.80, at least 0.82, or at least 0.85.

According to still further features in the described preferred embodiments, the inner facing has a diameter D, wherein an aspect ratio of the diameter D to length L is at least 0.25, at least 0.30, or at least 0.34.

According to still further features in the described preferred embodiments, the outer facing spans, in at least one location, an arc corresponding to an angle of at least 180°, at least 225°, or at least 270° of the inner surface.

According to still further features in the described preferred embodiments, the outer facing spans, in at least one location, an arc corresponding to an angle of 360° of the inner surface.

According to still further features in the described preferred embodiments, the emitter body is generally cylindrical.

According to still further features in the described preferred embodiments, the emitter body is generally cylindrical over all of length La.

According to still further features in the described preferred embodiments, the emitter body is generally cylindrical over all of length L.

According to still further features in the described preferred embodiments, the pressure-reducing section includes at least one labyrinth channel.

According to still further features in the described preferred embodiments, the distance between a first end of the emitter body and a proximal end of the functionally active sections disposed proximally to the first end, is less than 9 mm, less than 7 mm, less than 5 mm, or less than 4 mm.

According to still further features in the described preferred embodiments, the functionally active sections are substantially longitudinally continuous with respect to the body.

According to still further features in the described preferred embodiments, the pipe has at least one additional aperture disposed therethrough, the additional aperture situated within length L, but longitudinally outside of the longitudinal segment of the drip emitter.

According to still further features in the described preferred embodiments, the liquid inlet section includes a filtration section.

According to still further features in the described preferred embodiments, the outer surface of the pipe has at least one protrusion indicating a radial alignment of the emitter within the pipe.

According to still further features in the described preferred embodiments, the emitter has at least one alignment protrusion in the outer facing, the alignment protrusion at least partially protruding into the pipe.

According to still further features in the described preferred embodiments, the outer surface of the pipe has at least one mark, groove, or other external feature indicating a radial alignment of the emitter within the pipe.

According to still further features in the described preferred embodiments, an opening passes through the emitter body, whereby the inner facing and the outer facing are in fluid communication, the liquid inlet section adapted to receive the liquid from within the pipe, via the inner facing, and to deliver the liquid, via the opening, to the outer facing.

According to still further features in the described preferred embodiments, the functionally passive section is disposed completely within the longitudinal segment.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
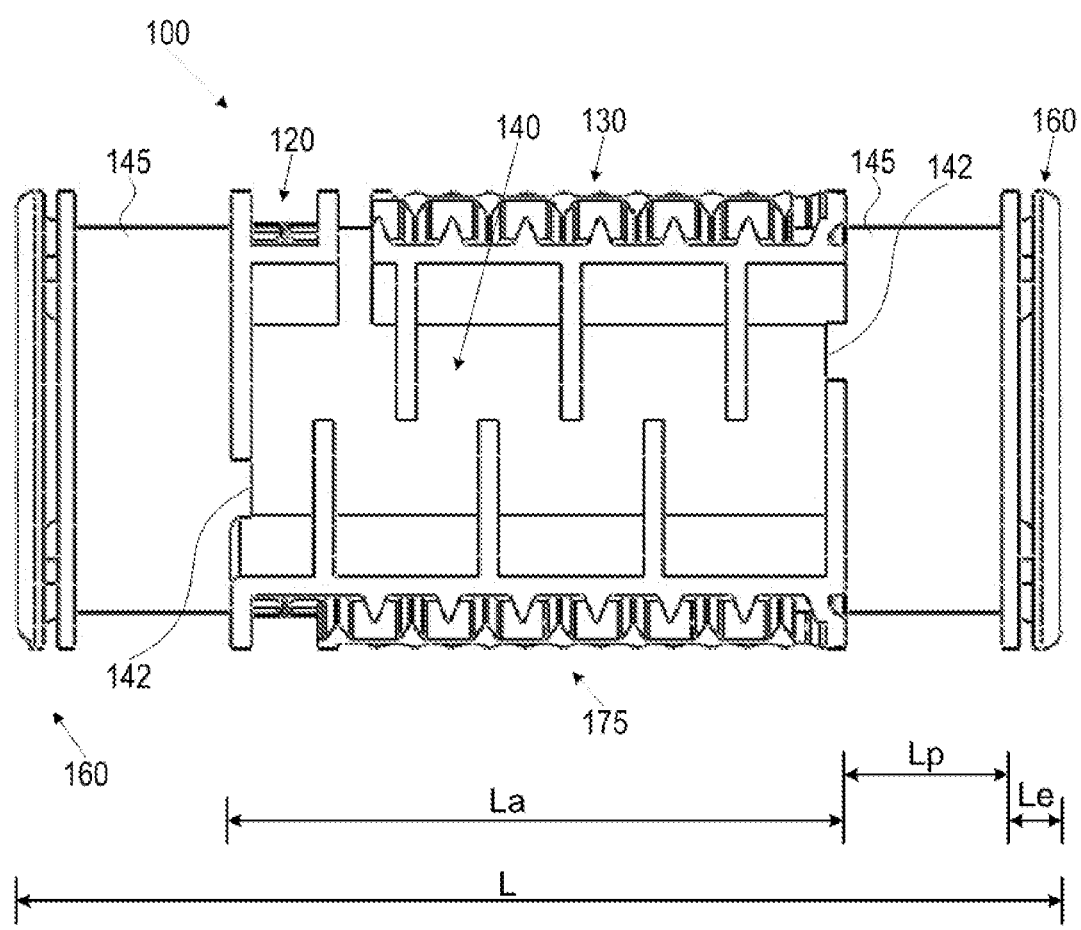
FIG. 1 is a side view of a drip irrigation emitter of the prior art.

The principles and operation of the cylindrical drip irrigation emitter according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

With reference now to the drawings, FIG. 1 is a side view of a drip irrigation emitter 100 of the prior art. Drip irrigation emitter 100 is a cylindrical emitter, adapted to be bonded to an irrigation pipe 210, shown in FIG. 2. Emitter 100 includes a liquid inlet section 120, a labyrinth channel 130, and a liquid transfer section 140.

Liquid inlet section 120 fluidly communicates with labyrinth channel 130, which in turn fluidly communicates with liquid transfer section 140. Thus, water passes through liquid inlet section 120, into labyrinth channel 130, and winds through labyrinth channel 130, ultimately discharging into liquid transfer section 140. The water exits liquid transfer section 140 via an opening 142 disposed at each end thereof, and subsequently enters generally annular discharge regions 145, each of which is distally located with respect to labyrinth channel 130, i.e., towards each emitter end fixture 160.

Figure 2:
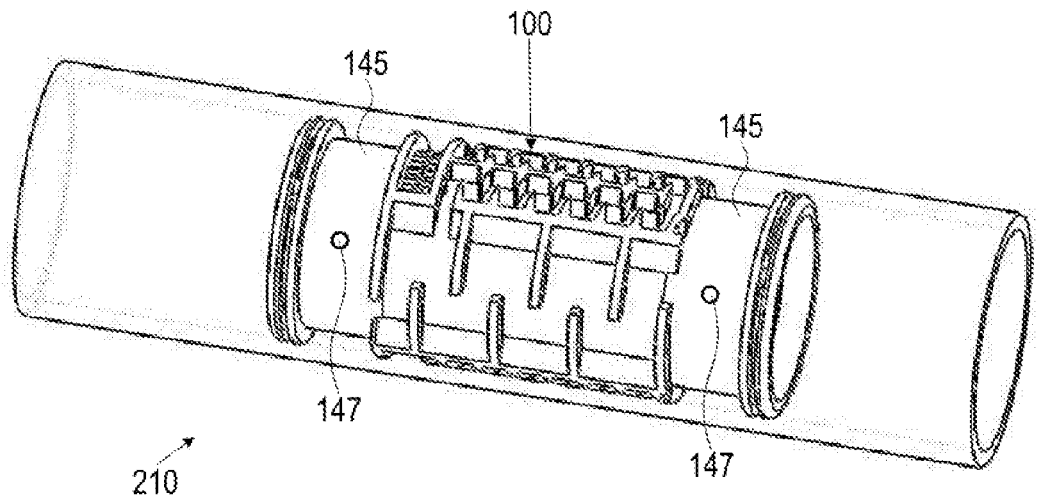
FIG. 2 is a perspective view of the drip irrigation emitter of FIG. 1, disposed within a partially transparent irrigation pipe.

FIG. 2 is a perspective view of drip irrigation emitter 100 of FIG. 1, disposed within irrigation pipe 210. According to methods of the prior art, during the extrusion-based process for producing irrigation pipes such as irrigation pipe 210, drip emitters such as drip emitter 100 may typically be affixed to the interior surface of the pipe, at substantially fixed intervals (time and distance). Apertures such as apertures 147 are formed through the wall of the irrigation pipe, based on the estimated longitudinal position of each drip emitter within the pipe. More specifically, apertures 147 are formed through the wall of the irrigation pipe, based on the estimated longitudinal position of annular discharge regions 145 of each drip emitter 100 within irrigation pipe 210. The longitudinal length Lp of each annular discharge region 145 is typically 4-7 mm, to ensure that each aperture 147 is generally aligned with a respective annular discharge region 145.

Water flowrate and optional pressure control are effected upstream of annular discharge regions 145, such that the main function of discharge regions 145 is to enable passage of the water into a discharge aperture in the wall of the pipe or conduit (as shown in FIG. 2). Thus, annular discharge regions 145 may be considered substantially, functionally passive length sections, in that they are disposed towards the end of the water flowpath, downstream of the pressure reduction section, and any pressure control section. The pressure reduction section (e.g., a labyrinth), and pressure control section of the drip emitter may be considered functionally active sections.

The market for drip irrigation systems is continually demanding improved performance and improved cost efficiencies for these systems. I have recognized several deficiencies in discharge region 145, including appreciable waste of raw materials, additional energy expenditure per emitter produced, relatively high shipping and storage volumes, and lower throughput of emitters through the feeding system.

Referring again to FIG. 1, the total length L of emitter 100 substantially consists of the sum of the total length of a functionally active section 175 (described in greater detail hereinbelow), the length of each emitter end fixture 160, and the length of each annular discharge region 145:

$$L = La + 2 \cdot Le + 2 \cdot Lp.$$

Significantly, the length ratio of the annular discharge regions to the total length of the prior art emitters may be at least 0.25, and more typically, at least 0.30. In some of the more advanced, compact emitters of the prior art, the length ratio of the annular discharge regions to the total length of the emitter body may be at least 0.35.

I have discovered that a method in which Lp may be substantially eliminated, enabling the use of a drip emitter that is at least 25-35% more compact with respect to emitters of the prior art. As will be elaborated in detail hereinbelow, the cylindrical-type drip emitters according to the present invention are designed to effect an at least partial discharge of the effluent water via a region that is longitudinally aligned with a functionally active section of the emitters, thereby obviating the need for the annular discharge regions of the prior art.

Figure 3:
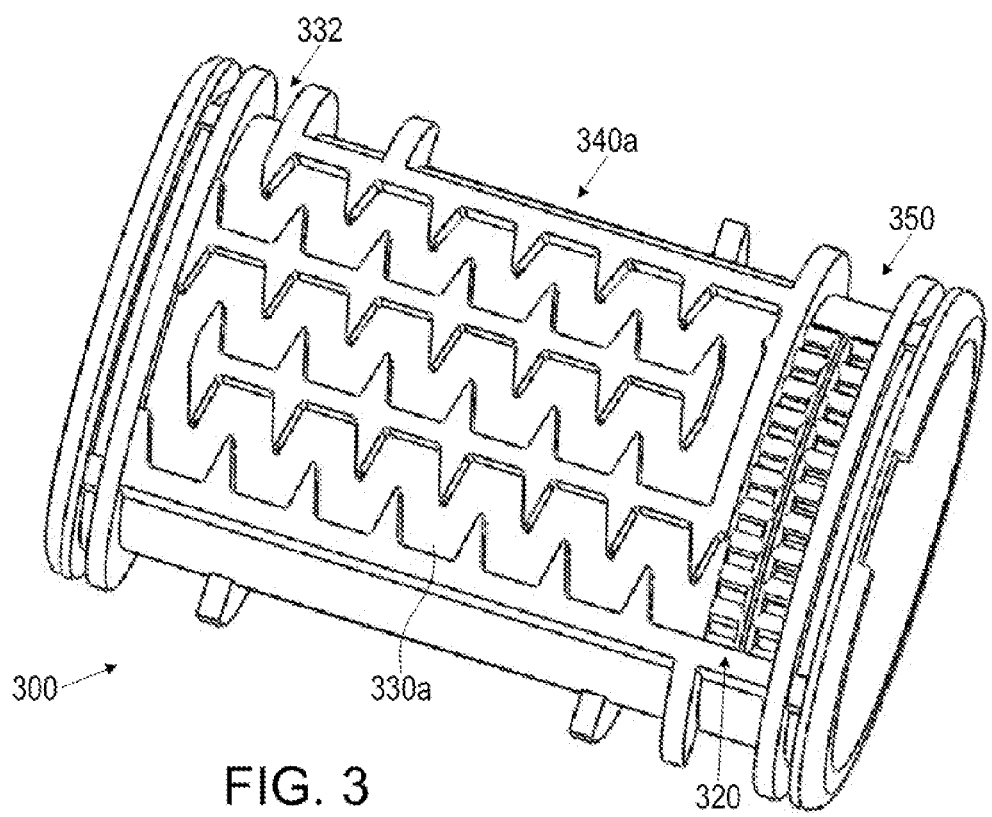
FIG. 3 provides a perspective view of a drip irrigation emitter according to an exemplary embodiment of the present invention.
Figure 4:
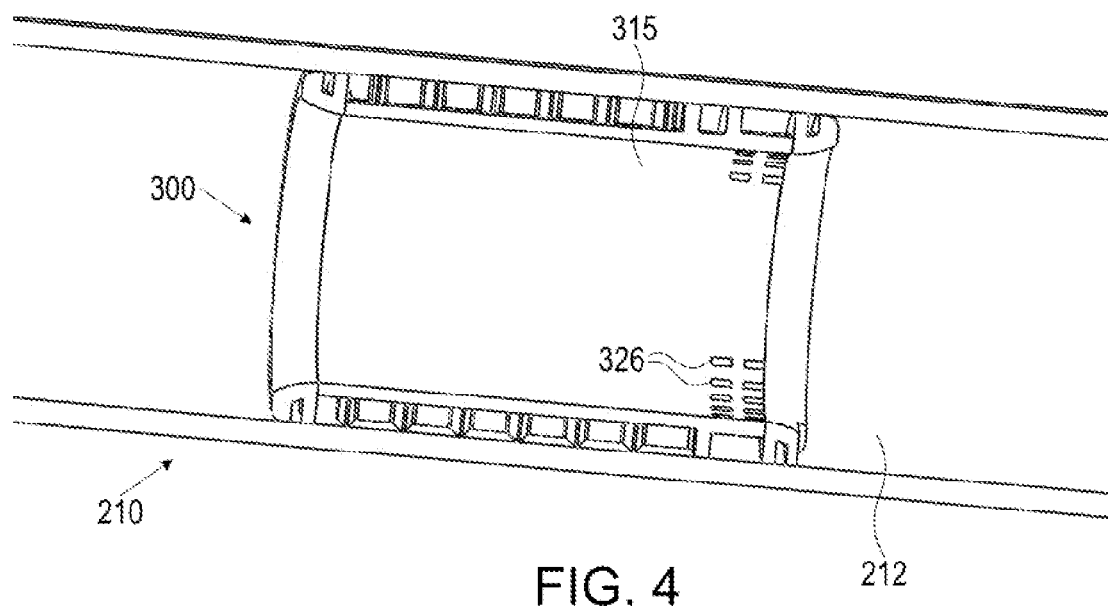
FIG. 4 is an axially cut-open view of the drip irrigation emitter of FIG. 3, disposed within a partially transparent irrigation pipe.

With reference now to FIG. 3 and FIG. 4, FIG. 3 is a perspective view of a drip irrigation emitter 300 according to an exemplary embodiment of the present invention. FIG. 4 is an axially cut-open view of drip irrigation emitter 300 of FIG. 3, disposed within irrigation pipe 210. Drip irrigation emitter 300 is an in-line, cylindrical emitter, adapted to be disposed within, and secured within or attached (e.g., bonded) to, an irrigation pipe 210, shown in FIG. 4. Emitter 300 may include a filtration or liquid inlet section 320, at least one pressure-reducing section such as a labyrinth channel 330a, and at least one functionally passive section or liquid transfer section such as section 340a, a small portion of which can be seen in FIG. 3.

Emitter 300 may advantageously have an emitter end fixture 360 on each longitudinal end of the emitter. Emitter end fixture 360 may be identical or substantially identical to emitter end fixtures known in the art, such as emitter end fixture 160 provided in FIG. 1.

FIG. 4 shows an inner facing 315 of emitter 300. Inner facing 315 may advantageously include a plurality of inlet openings or apertures such as openings 326, which provide fluid communication between a volume contained by inner facing 315 and an outer facing 350 of emitter 300. As will be appreciated by one of ordinary skill in the art, openings 326 are adapted to inhibit coarse particles in the water from entering, and clogging, emitter 300.

The vast majority of the water within irrigation pipe 210 flows in longitudinal fashion through emitter 300, and flows out into downstream section 212 of irrigation pipe 210. A minute fraction of the water flows through openings 326, towards outer facing 350 of emitter 300. Having passed through filtration section 320, the water is now free to flow into labyrinth channel 330a. The flow of water exits labyrinth channel 330a via labyrinth intermediate channel 332, which may typically extend to an opposite side or face of emitter 300, shown in FIG. 5.

Over the course of the tortuous path of labyrinth channel 330a, a designed, pre-determined, or otherwise pressure drop may be achieved, as will be readily understood by those of ordinary skill in the art.

Figure 5:
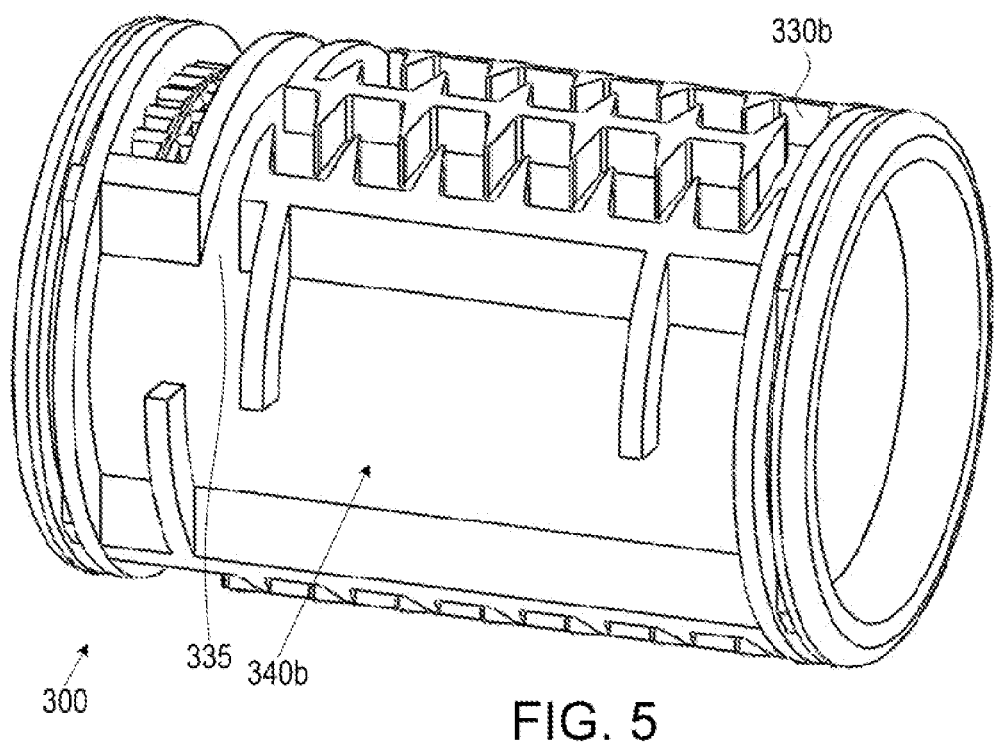
FIG. 5 provides a second perspective view of the drip irrigation emitter of FIG. 3.

FIG. 5 provides another perspective view of drip irrigation emitter 300, in which labyrinth channel 330b and a functionally passive section or liquid transfer section 340b are prominently displayed. Labyrinth channel 330b fluidly communicates with intermediate channel 332 (shown in FIG. 3), whereby the flow of water is discharged from intermediate channel 332 into a first or proximal end of labyrinth channel 330b.

The far or distal end of labyrinth channel 330b fluidly communicates with liquid transfer section 340b. It may be advantageous, as shown in FIG. 5, for the distal end of labyrinth channel 330b to fluidly communicate directly with a distribution passageway 335, which in turn feeds into liquid transfer section 340b, and preferably, into liquid transfer section 340a as well.

Liquid transfer sections 340a (shown in FIG. 3) and 340b have a particular radial orientation with respect to the body of emitter 300. In exemplary emitter 300, each of liquid transfer sections 340a and 340b are disposed on an arc or contour representing about 25% of the total outer perimeter or circumference of emitter 300. It will be appreciated by those of ordinary skill in the art that the number of liquid transfer sections, as well as the individual and total fractions of the emitter perimeter or circumference, may vary due to various design constraints or choices. It is critical, however, that the total fraction of the emitter perimeter or circumference be less than 1, and typically less than 0.8, less than 0.7, or less than 0.6, to enable the disposition of at least one functionally active section (e.g., a pressure reducing section or a pressure controlling section) substantially alongside the liquid transfer section or sections, within the same longitudinal section or segment of the emitter body. This arrangement will be elaborated further with respect to FIGS. 6 and 7.

Figure 6:
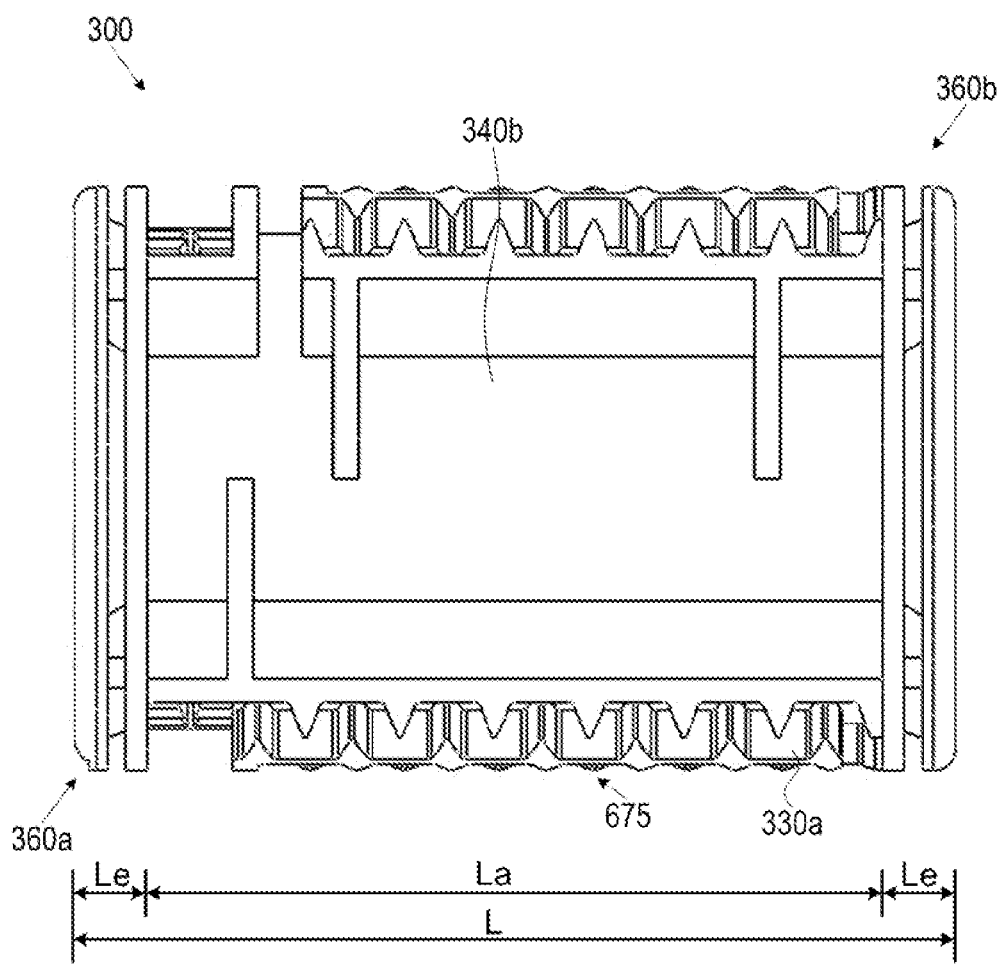
FIG. 6 is a side view of the inventive drip irrigation emitter of FIG. 3.

FIG. 6 is a side view of drip irrigation emitter 300. The length L of emitter 300 includes the length of a first emitter end fixture 360a (length=Le), at least one functionally active section such as section 675 having a total length La along the body of emitter 300, and the length of a second emitter end fixture 360b. Emitter end fixtures 360a. 360b are typically identical, such that the total length of these fixtures is 2·Le.

Typically, length L of emitter 300 consists of, or substantially consists of, the sum of the total length of functionally active section 675 and the lengths of emitter end fixtures 360a, 360b:

$$L = La + 2 \cdot Le.$$

In this exemplary embodiment, the length La of functionally active section 675 is determined by the sum of the length of liquid inlet section 320 and the length of the labyrinth channel (e.g., labyrinth channel 330a). More generally, functionally active section 675 may include a pressure controlling section (an exemplary embodiment of which is provided in FIG. 9 and the associated description). Also, the sections of labyrinth channel provided herein are meant as exemplary embodiments of pressure reducing sections. It will be appreciated that various types of pressure reducing means and sections will be apparent to those of ordinary skill in the art.

Figure 7:
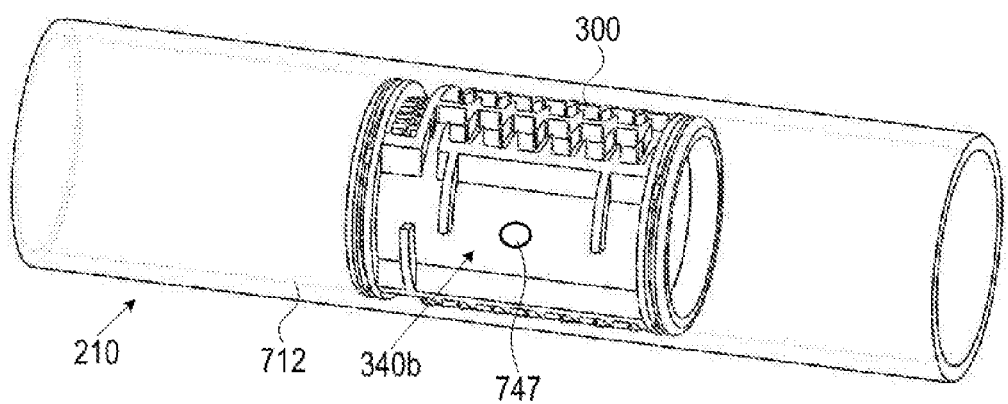
FIG. 7 is a perspective view of the inventive drip irrigation emitter of FIG. 3, disposed within a partially transparent irrigation pipe.

Referring now to FIG. 7, FIG. 7 is a perspective view of inventive drip irrigation emitter 300, disposed within irrigation pipe 210. In emitter 300, water or liquid discharged from functionally active section 675 may collect within functionally passive section or liquid transfer section 340b, or between section 340b and an inner surface 712 of pipe 210. A discharge aperture 747 is disposed in the wall of pipe 210, such that section 340b may fluidly communicate with, or directly fluidly communicate with, an environment outside of pipe 210, via aperture 747.

Discharge aperture 747 is both longitudinally aligned within a longitudinal segment defined by functionally active section 675, and radially aligned with functionally passive section 340b. Inadvertent misalignment of discharge aperture 747, whereby aperture 747 is radially aligned with a functionally active section, may severely compromise or destroy the function of the emitter.

Referring back to FIG. 6, obviation of the annular discharge regions of the prior art cylindrical emitters enables an increased ratio of the total length La of the functionally active sections to length L of the emitter body. This length ratio may be at least 0.60, or at least 0.65, and more typically, at least 0.70, at least 0.75, at least 0.78, at least 0.80, at least 0.82, or at least 0.85.

Figure 8:
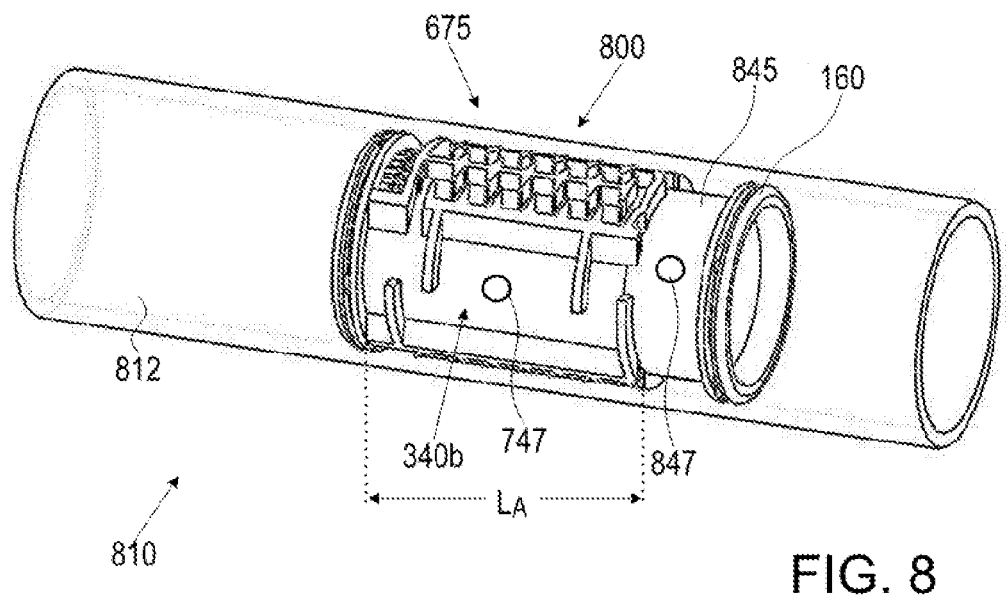
FIG. 8 is a perspective view of another exemplary embodiment of the inventive drip irrigation emitter, disposed within a partially transparent irrigation pipe.

FIG. 8 is a perspective view of another exemplary embodiment of a drip irrigation emitter 800 according to the present invention, disposed within a pipe 810. As with drip irrigation emitter 300 provided in FIG. 7, water or liquid discharged from the functionally active section of the emitter may collect within functionally passive section or liquid transfer section 340b, or between section 340b and an inner surface 812 of pipe 810. A discharge aperture 747 is disposed in the wall of pipe 210, such that section 340b may fluidly communicate with, or directly fluidly communicate with, an environment outside of pipe 810, via aperture 747. Discharge aperture 747 is both longitudinally aligned within a longitudinal segment defined by functionally active section 675, and radially aligned with functionally passive section 340b.

Drip irrigation emitter 800 has a generally annular discharge region 845, which may be substantially similar to annular discharge region 145 described with respect to FIG. 1. Annular discharge region 845 is disposed between functionally active section 675 and emitter end fixture 160. An additional aperture 847 is formed through the wall of pipe 810, based on the estimated longitudinal position of annular discharge region 845 of each drip emitter 800 within irrigation pipe 810.

Figure 9:
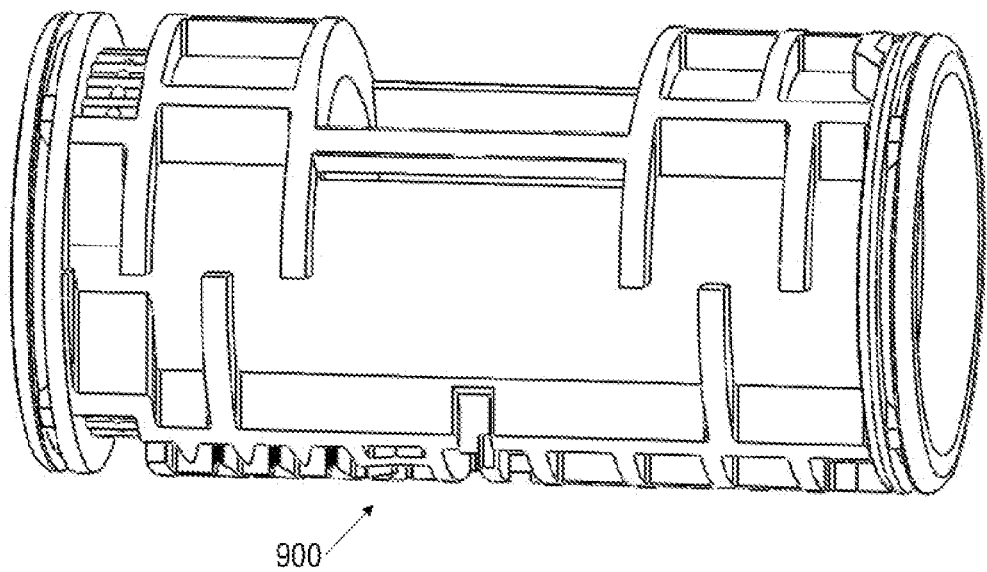
FIG. 9 provides a perspective view of a pressure-controlling drip irrigation emitter, according to another exemplary embodiment of the present invention.

FIG. 9 provides a perspective view of a pressure-controlling drip irrigation emitter 900, according to another exemplary embodiment of the present invention. As described hereinabove, the pressure-controlling section forms a portion of the functionally active section of the emitter. The pressure-controlling section is not described in detail, being well known to those of ordinary skill in the art of irrigation drip emitters.

Figure 10:
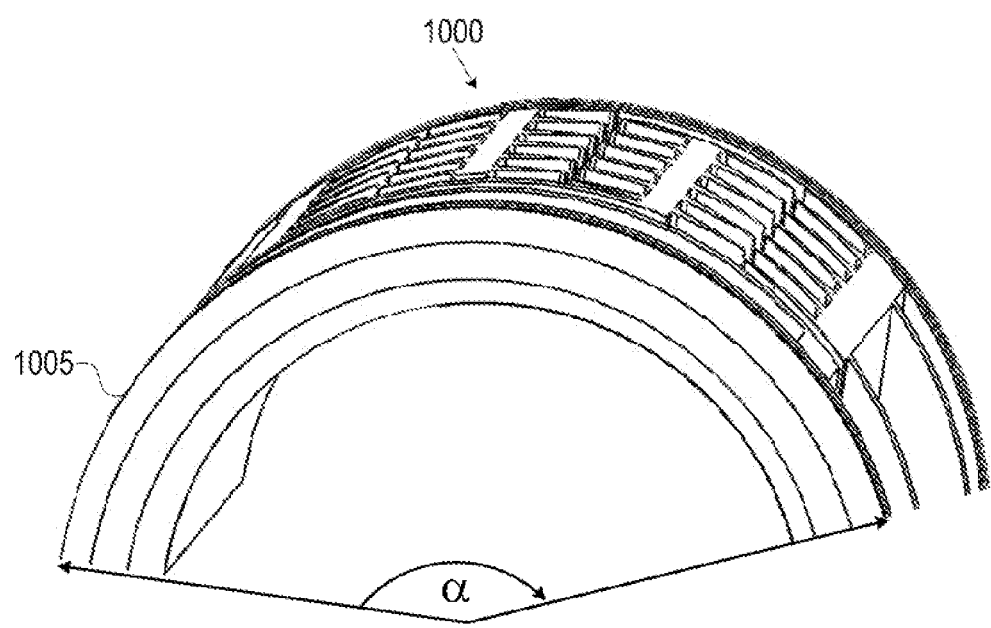
FIG. 10 is a perspective view of another exemplary embodiment of the inventive drip irrigation emitter, the outer surface of the emitter body having an arc or contour of about 160°.

FIG. 10 is a perspective view of another embodiment of a drip irrigation emitter 1000, according to the present invention. In this exemplary embodiment, an outer surface 1105 of emitter 1000 has an arc or contour (a) of about 160°. The outer surface of the drip emitters of the present invention typically span at least 140°, at least 160°, or at least 180°.

Figure 11A:
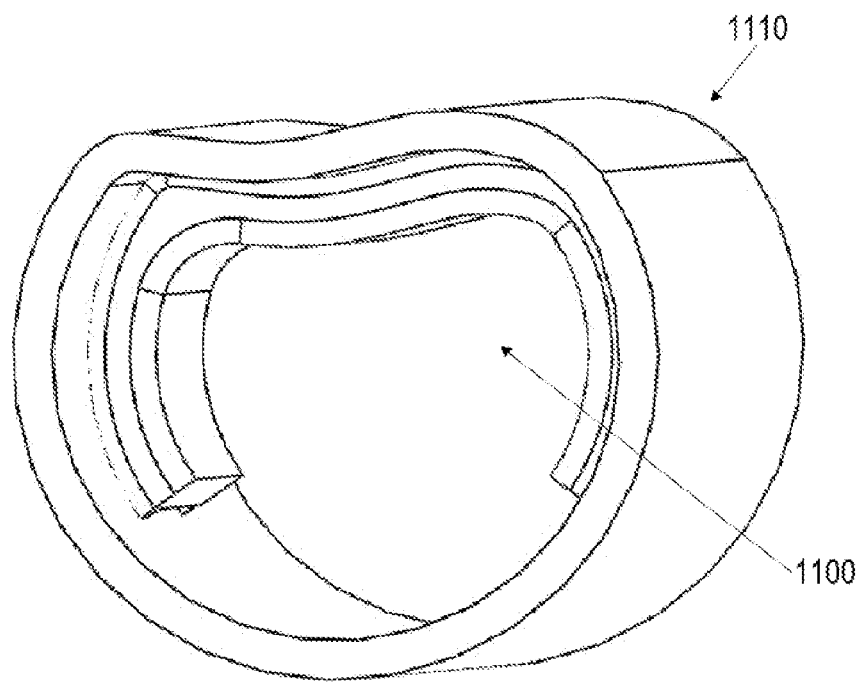
FIG. 11A is a perspective view of another exemplary embodiment of the inventive drip emitter, disposed within a within a non-cylindrical irrigation pipe.

FIG. 11A is a perspective view of a drip emitter 1100 according to another exemplary embodiment of the present invention, disposed within a non-cylindrical irrigation pipe 1110 having a non-cylindrical contour.

Figure 11B:
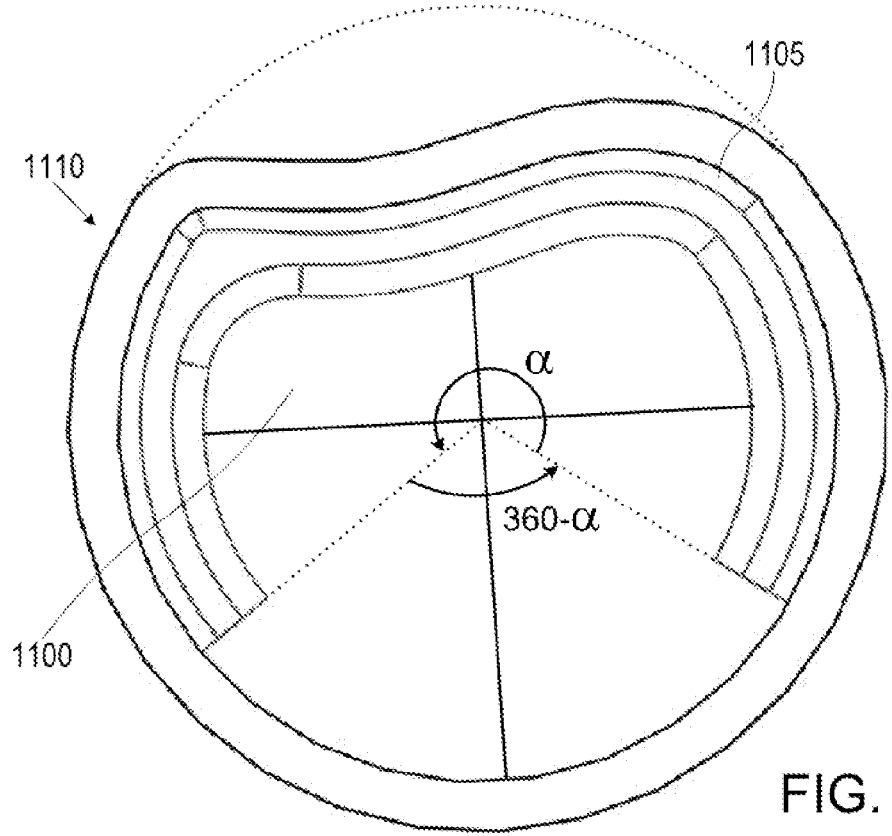
FIG. 11B is a wire-rim drawing of the drip irrigation emitter of FIG. 11A, in which the outer surface of the emitter body has a contour of about 250°.

FIG. 11B is a wire-rim drawing of drip irrigation emitter 1100. In this exemplary embodiment, an outer surface 1105 of the emitter body has a contour (a) of about 250°.

Figure 12A:
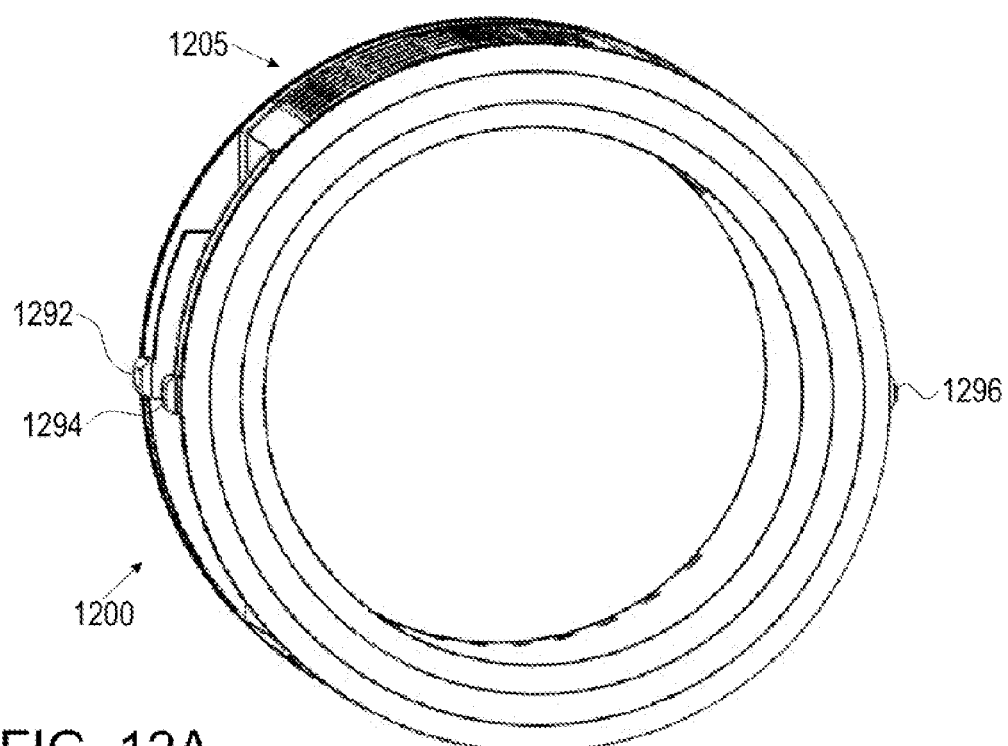
FIG. 12A is a generally axial perspective view of another exemplary embodiment of the inventive drip emitter, having alignment protrusions disposed in an outer facing of the emitter body.

FIG. 12A is a generally axial view of a drip emitter 1200 according to another exemplary embodiment of the present invention, having alignment protrusions 1292, 1294 and 1296 disposed in an outer facing 1205 of emitter 1200. Alignment protrusion 1296 may be disposed on a radially opposite side of emitter 1200, with respect to alignment protrusions 1292, 1294.

Figure 12B:
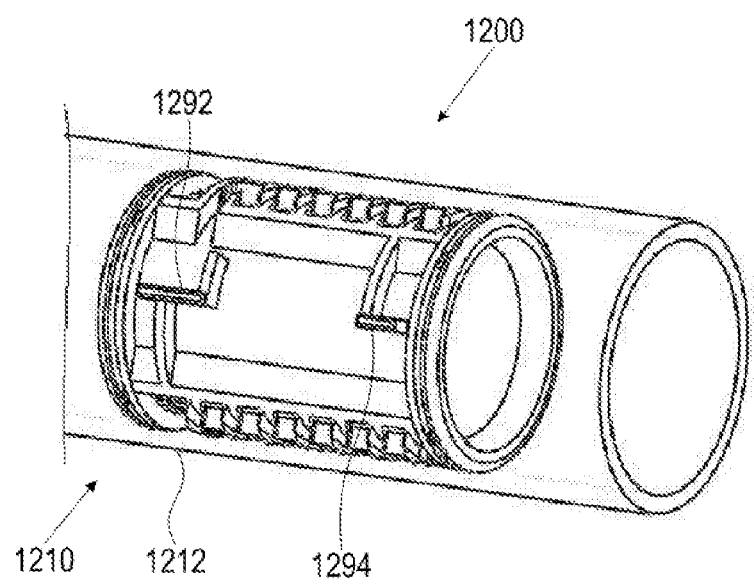
FIG. 12B is another perspective view of the drip emitter of FIG. 12A, disposed within a partially transparent pipe.

FIG. 12B is a perspective view of drip emitter 1200, disposed within a pipe 1210. Typically, drip emitters such as drip emitter 1200 are inserted into an irrigation pipe such as pipe 1210, after the pipe has been extruded. Alignment protrusions 1292, 1294 may be adapted whereby, during the insertion of drip emitter 1200 into pipe 1210, external protrusions are formed in an outer surface 1212 of pipe 1210. Consequently, the radial alignment of emitter 1200 within pipe 1210 may be observed or determined based on the radial positioning of these external protrusions.

Knowing the radial alignment of emitter 1200 within pipe 1210 may be important in identifying the proper position of discharge apertures such as discharge aperture 747 (shown in FIGS. 7 and 8).

Alternatively or additionally, an external mark (stripe, groove, etc.) may be made on outer surface 1212 of pipe 1210, to designate the radial alignment of emitter 1200 within pipe 1210.

Various detection means, including electromagnetic detection methods and apparatus, may be utilized to determine a position of the drip emitter within the pipe. Such methods and apparatus may include, but are not limited to, X-ray imaging or infra-red imaging.

As used herein in the specification and in the claims section that follows, the term "functionally passive section", with respect to an emitter or emitter body, refers to a section disposed towards a downstream end of the water flowpath, i.e., downstream of the pressure reduction section, and any pressure control section.

As used herein in the specification and in the claims section that follows, the term "functionally active section", with respect to an emitter or emitter body, is meant to include a section in which the pressure is controlled and/or reduced. The term "functionally active section" is further meant to include a liquid inlet section such as filtration or liquid inlet section 320 shown in FIG. 3.

As used herein in the specification and in the claims section that follows, the term "pressure-reducing section", with respect to a drip emitter, is meant as used by those of skill in the art of drip irrigation emitters. One typical type of pressure-reducing section is a labyrinth-containing section.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A cylindrical in-line drip emitter for securing to a cylindrical inner surface of an irrigation pipe, so as to enable water flowing within the irrigation pipe to pass downstream through the drip emitter and out of the irrigation pipe via an aperture disposed in a wall of the irrigation pipe, the drip emitter comprising:

(a) a cylindrical emitter body having an inner facing and an outer facing, said outer facing having a convex contour adapted in complementary fashion to a concave contour of an imaginary cylindrical surface enveloping said outer facing and touching thereupon, said outer facing spanning, in at least one location, an arc corresponding to an angle of 360° of said imaginary cylindrical surface, wherein a total length L constitutes an entire length of the cylindrical drip emitter, and wherein said inner facing has a diameter D;

(b) a fluid inlet passage having at least one opening, said at least one opening passing through said cylindrical emitter body, whereby said inner facing and said outer facing are in fluid communication;

(c) a pressure-reducing passage including at least one labyrinth channel;

said fluid inlet passage and said pressure-reducing passage forming at least part of a functionally active passage, said functionally active passage having a total length La, said functionally active passage longitudinally disposed along a first arc of said outer facing, said functionally active passage longitudinally defining a position of a longitudinal segment of the cylindrical drip emitter, and (d) a liquid transfer volume, on said outer facing, disposed longitudinally alongside said functionally active passage, outside of said first arc, and within said longitudinal segment;

whereby, when said outer facing is secured against the cylindrical inner surface of the irrigation pipe, and the cylindrical inner surface of the irrigation pipe has said concave contour of said imaginary cylindrical surface, said liquid transfer volume forms a chamber disposed in fluid communication with said functionally active passage, and downstream thereto, such that a fluid flow path fluidly connects between said at least one opening of said fluid inlet passage, at a fluid inlet of said fluid flow path, and said liquid transfer volume, via said functionally active passage;

wherein a length ratio of said total length La to said total length L is at least 0.70; and wherein an aspect ratio of said diameter D to said total length L is at least 0.30.

2. The cylindrical in-line drip emitter of claim 1, wherein said length ratio of said total length La to said total length L is at least 0.72.

3. The cylindrical in-line drip emitter of claim 1, wherein said length ratio of said total length La to said total length L is at least 0.75.

4. The in-line drip emitter of claim 3, wherein said angle is 360°, within said longitudinal segment.

5. The cylindrical in-line drip emitter of claim 3, wherein said fluid inlet passage includes a filter.

6. The cylindrical in-line drip emitter of claim 1, wherein said length ratio of said total length La to said total length L is at least 0.78.

7. The cylindrical in-line drip emitter of claim 1, wherein said length ratio of said total length La to said total length L is at least 0.80.

8. The in-line drip emitter of claim 7, wherein said angle is 360°, within said longitudinal segment.

9. The cylindrical in-line drip emitter of claim 1, wherein said length ratio of said total length La to said total length L is at least 0.82.

10. The cylindrical in-line drip emitter of claim 1, wherein said cylindrical emitter body has at least one alignment protrusion disposed in said outer facing.

11. The cylindrical in-line drip emitter of claim 1, wherein said cylindrical emitter body is devoid of any cylindrical discharge regions disposed outside of said longitudinal segment.

12. The in-line drip emitter of claim 1, wherein said angle is 360°, within said longitudinal segment.

13. The cylindrical in-line drip emitter of claim 1, wherein a distance between a first end of said cylindrical emitter body and a proximal end of said functionally active passage disposed proximally to said first end, and between a second end of said cylindrical emitter body and a distal end of said functionally active passage disposed proximally to said second end, is less than 9 mm.

14. The cylindrical in-line drip emitter of claim 13, wherein said distance is less than 7 mm.

15. The cylindrical in-line drip emitter of claim 13, wherein said distance is less than 5 mm.

16. The cylindrical in-line drip emitter of claim 13, wherein said distance is less than 4 mm.

17. The cylindrical in-line drip emitter of claim 1, wherein said aspect ratio of said diameter D to said total length L is at least 0.34.

18. The cylindrical in-line drip emitter of claim 1, wherein said liquid transfer volume is disposed on a second arc of said outer facing, wherein said second arc is adjacent to said first arc.

19. A liquid delivery system comprising:
(a) the cylindrical in-line drip emitter of claim 1;
(b) the irrigation pipe having the aperture disposed in the wall, the irrigation pipe having an inner surface and an outer surface;

wherein the cylindrical in-line drip emitter is secured to said inner surface;

and wherein said aperture is disposed opposite said liquid transfer volume, so as to form a fluid discharge path between said liquid transfer volume and an ambient environment, via said aperture.

* * * * *